5 Sheets—Sheet 1.
J. BIGELOW.
Sewing-Machine.
No. 9,112. Reissued Mar. 9, 1880.
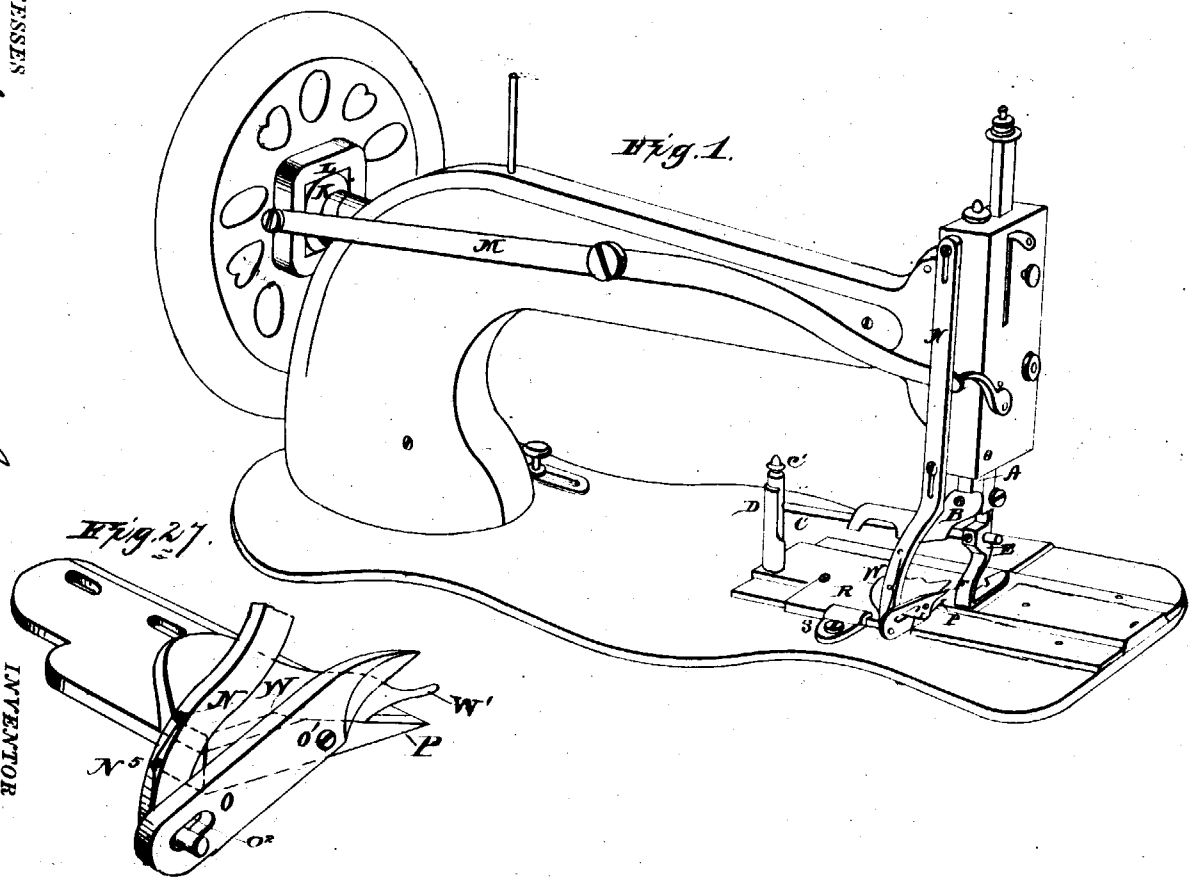
WITNESSES
F. L. Durand
J. J. McCarthy
By John Bigelow.
L. Deane. ATTORNEY.
INVENTOR

J. BIGELOW.

Sewing-Machine.

No. 9,112. Reissued Mar. 9, 1880.

WITNESSES

F. L. Ourand

P. J. McCarthy.

By

INVENTOR

John Bigelow

L. Deane ATTORNEY

J. BIGELOW.

Sewing-Machine.

No. 9,112. Reissued Mar. 9, 1880.

WITNESSES

F. L. Durand,

P. J. McCarthy.

By

INVENTOR

John Bigelow.

L. Deane. ATTORNEY

5 Sh ets—Sheet
J. BIGELOW.
Sewing-Machine.
No. 9,112. Reissued Mar. 9, 1880
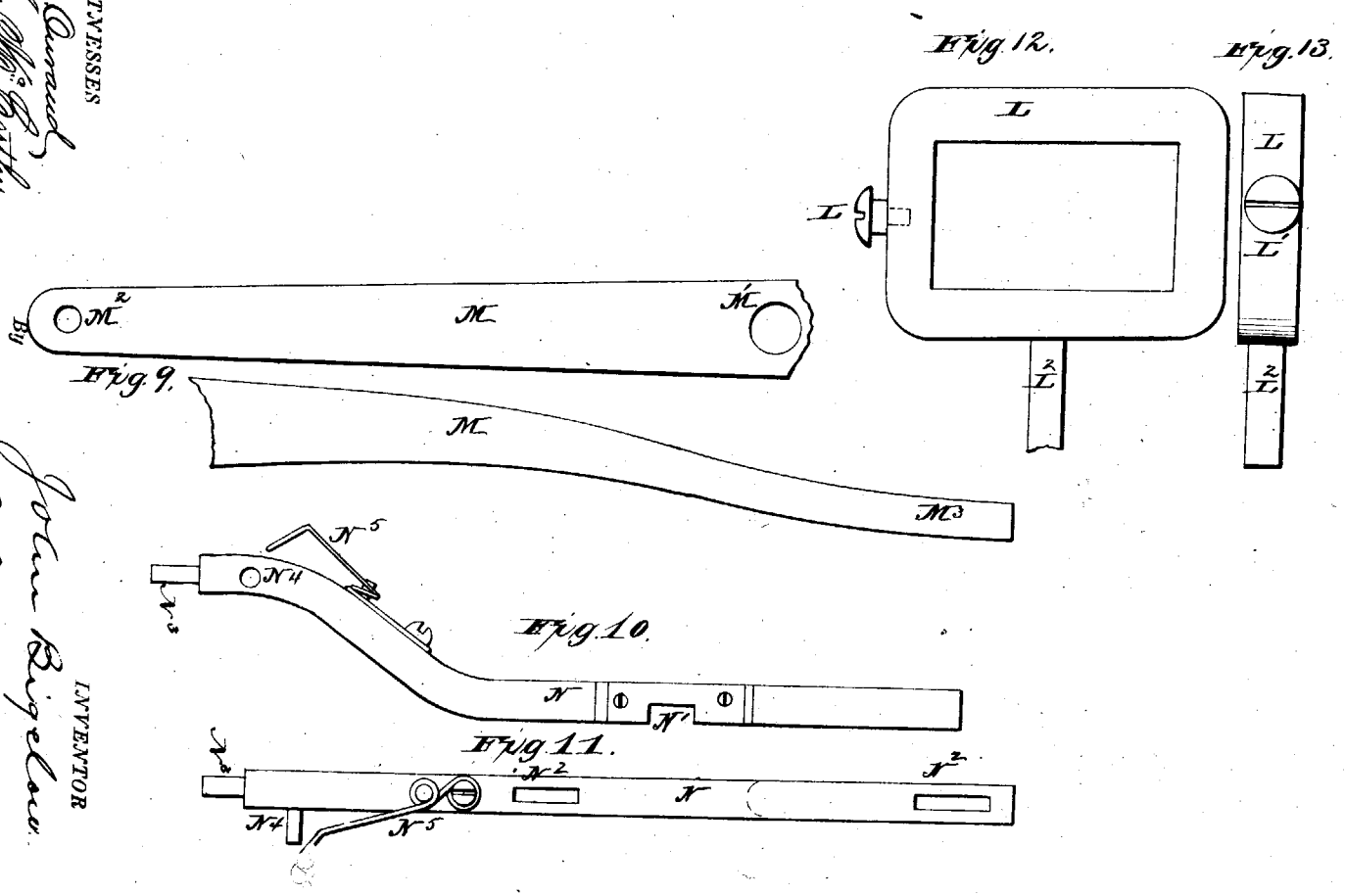
WITNESSES
F. L. Durand
J. J. McCarthy.
INVENTOR
John Bigelow.
L. Deane ATTORNEY

J. BIGELOW.

Sewing-Machine.

No. 9,112. Reissued Mar. 9, 1880.

WITNESSES

F. L. Durand.

J. J. McCarthy.

INVENTOR

John Bigelow

By L. Deane ATTORNEY

UNITED STATES PATENT OFFICE.

JOHN BIGELOW, OF PHILADELPHIA, PENNSYLVANIA.

SEWING-MACHINE.

SPECIFICATION forming part of Reissued Letters Patent No. 9,112, dated March 9, 1880.

Original No. 214,354, dated April 15, 1879. Application for reissue filed August 8, 1879.

DIVISION A.

*To all whom it may concern:*

Be it known that I, JOHN BIGELOW, of Philadelphia, in the county of Philadelphia and State of Pennsylvania, have invented certain new and useful Improvements in Sewing-Machines; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
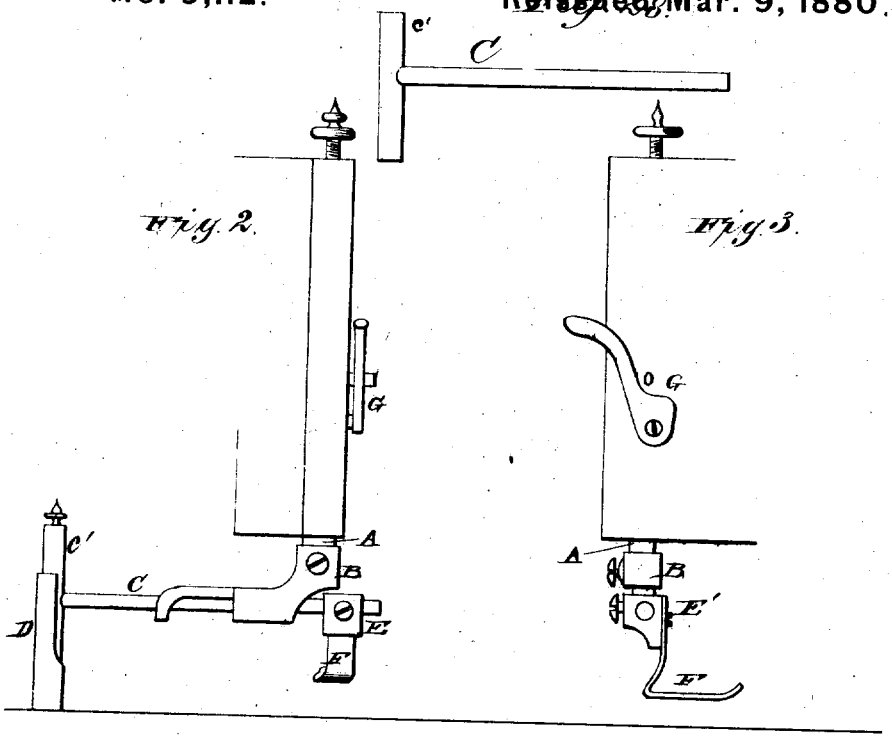
Figure 4:
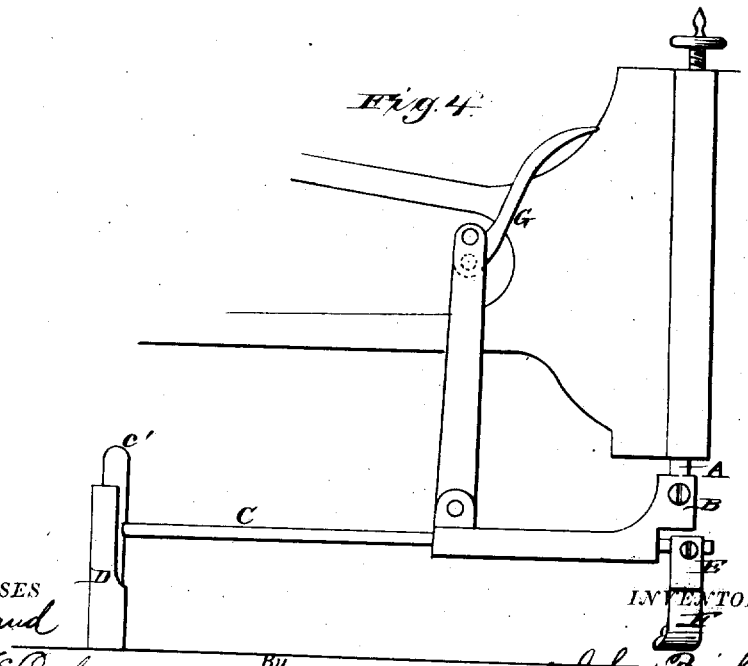
Figure 7:
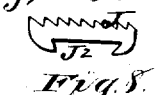
Figure 8:
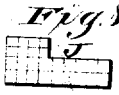
Figure 5:
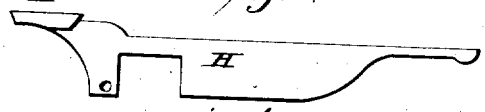
Figure 6:
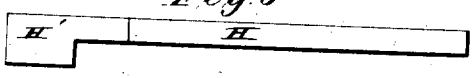
Figure 25:
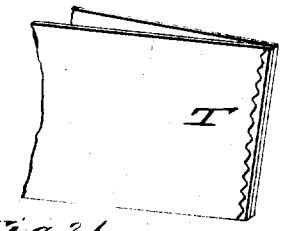
Figure 26:
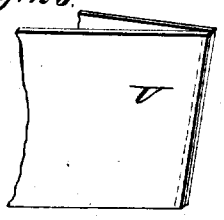
Figure 15:
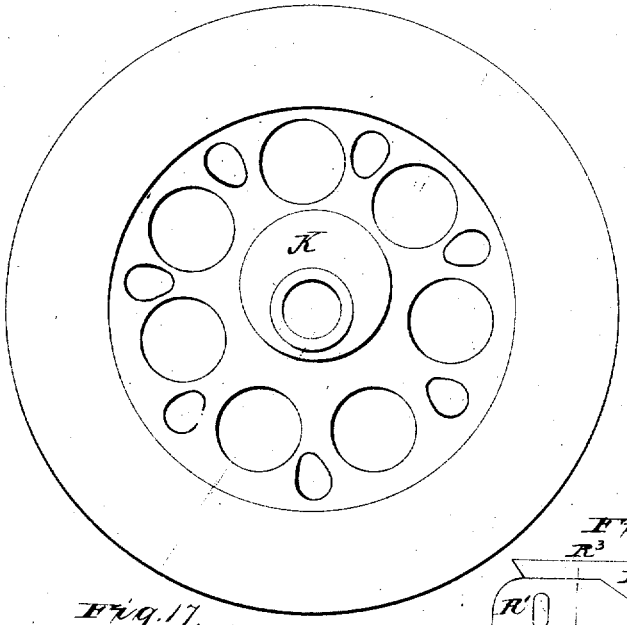
Figure 16:
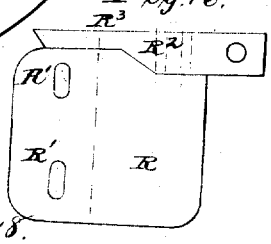
Figure 17:
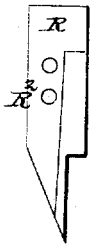
Figure 18:
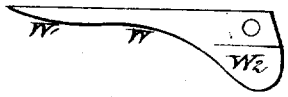
Figure 19:
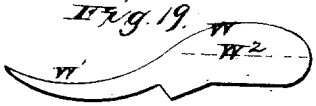
Figure 14:
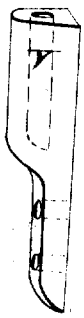
Figure 21:
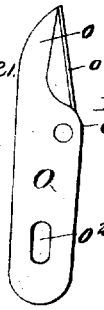
Figure 22:
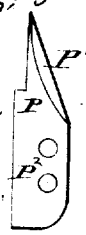
Figure 20:
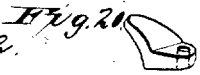
Figure 23:
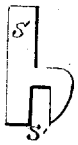
Figure 24:
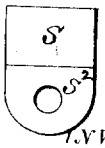

Figure 1 shows the trimmer and presser-foot attachments as applied to a sewing-machine. Figs. 2 and 3 are front and end views of the presser-foot attachment. Fig. 4 shows another method of applying the lifting device to the presser-foot. Figs. 5 and 6 are side and top views of my improved feed-dog; Figs. 7 and 8, side and top views of the feed-dog slide. Fig. 9 shows the rocking lever by which the actuating motion is conveyed from the motive cam to the trimming device; Figs. 10 and 11, side and front views of an upright vertically-reciprocating lever, which receives its motion from the rocking lever, Fig. 9, and conveys the same to the upper cutting-blade of the trimmer proper; Figs. 12 and 13, front and side views of the collar which embraces the actuating trimmer-cam and receives from it motion, which it conveys to one end of the rocking lever, Fig. 9. Fig. 14 is the rest and guide for the collar shown in Figs. 12 and 13. Fig. 15 shows the trimmer-cam on the driving-wheel. Figs. 16 and 17 show top and end views of the support for the lower blade of the trimmer, on which the upper blade rocks. Figs. 18, 19, and 20 show top, side, and end views of the trimmer-guard and work-guide; Fig. 21, side view of upper trimmer-blade; Fig. 22, side view of lower trimmer-blade. Figs. 23 and 24 show top and side views of the guide for the support-plate shown in Figs. 16 and 17. Fig. 25 shows work sewed with the zigzag stitch and closely trimmed. Fig. 26 shows work sewed with a straight stitch and trimmed. Fig. 27 is a detail view of the guide and trimmer. Fig. 28 is a detail, showing the T-bar C C′ of Figs. 1, 2, and 4.

My invention relates more particularly to that class of sewing-machines in which a zigzag stitch is made; and it is designed to especially adapt this class of machines for use in sewing and trimming knit goods.

Leather goods, when sewed by hand or machine, often have the edges of the seam trimmed by hand; but in some cases trimming devices have been applied to the ordinary straight-stitch sewing-machine. Cut knit goods, however, since they have usually been sewed with the ordinary straight stitch, have required to have a large amount of the fabric left on the outer edge of the seam, because otherwise, from the readiness with which such goods unravel when they are trimmed close to the sewing, the stitching will pull out; but by using the zigzag stitch the fabric may be cut very close to the sewing, as this stitch serves to bind the knitted threads together, forming a kind of selvage, thus preventing the seam from opening even when cut close to the sewing. When two pieces of knit goods are sewed together by the zigzag stitch and then cut close to the sewing, the effect is, to some extent, the same as when the seam is made over the edge of two pieces of selvage goods, as the stitch binds the edges of the materials, and the loose threads, if any, and the short fibers left by the action of the trimmer will felt together, especially in fulling and washing, producing an article much superior to any made with a straight line of sewing, whether cut close to the edge or not.

The ordinary trimmers, as usually arranged on sewing-machines, will not, for reasons hereinafter explained, make a smooth cut when used on the vibrating-plate zigzag-stitch sewing-machine. I have therefore combined with the zigzag-sewing machine, to better fit it for use on knit goods, an improved trimming device, so arranged that a smooth cut may be made at any desired degree of contiguity to the line of stitching without danger of destroying the seam, whereby the usefulness of the zigzag-stitch sewing-machines is very much increased, which practically inaugurates a new departure in the manufacture of hosiery, as my invention permits the use of cut knit goods without the bulky seams heretofore necessary in articles made therefrom, thus making a cheap article of hosiery that will be as comfortable to the wearer as regular-fashioned or selvage goods. In addition to this valuable point in my invention, its use will enable the manufacturer employing it to effect a considerable saving in material, as much of the fabric now left on the finished articles will be retained in the factory in the form of clippings, to be again used in making new cloth.

For convenience of description my invention may be divided into four main features, as follows:

First, in the combination of a trimming device with a zigzag-sewing mechanism.

My second improvement is in the presser-foot.

I am aware that heretofore the presser-foot has been attached to the sliding plate, from which it takes motion, receiving its pressure from the presser-bar of the machine. In such cases the presser-foot does not take a flat bearing on the work, but rides on one side of the foot or the other, as the work is thick or thin.

By my arrangement the reciprocating motion is obtained from the sliding plate; but the foot and its accompaniments are attached to the presser-bar of the machine, by which alone its pressure on the work is adjusted; also, it does not matter whether the work is thick or thin, whether the foot is high or low, its surface-bearing is always parallel with the plate of the machine.

My third improvement consists in combining a cutting or edge-trimming apparatus with the device used in the Blanchard overseaming and similar machines for imparting to the fabric being sewed a lateral motion at an angle to the usual direction of the line of feed, the two being so connected together as to cause the cloth and trimmer to move simultaneously, whereby an important advantage is gained in trimming the edges, as without such combined movement the cut made by the trimmer would be irregular or jagged, because the alternate cut of the trimming device would be made at different distances from the center of the line of sewing.

My fourth improvement consists in a device for uniting fabrics by sewing a line of zigzag stitching a short distance from the edge, then cutting off the surplus material close to the stitching during the process of sewing, thus forming a seam from cut fabrics analogous to one formed over the edges of selvage goods. No claim, however, is made in this application for the product made by this machine, as this feature forms the subject of Division B of this reissue.

In addition to these main features of my invention there are minor details of construction for the more effectual carrying out of the before-mentioned principal points, which will be hereinafter more fully described, and pointed out in the claims.

Having thus set forth the nature and objects of my improvements, I will now proceed to describe them in detail.

The feed-dog H, Figs. 5 and 6, is made like an ordinary feed-dog, except that the teeth are left off, and the part on which the teeth are usually formed is made into a male dovetail, H′, which fits into a corresponding female dovetail, $J^2$, cut into the under surface of cap J, provided with feeding-teeth J′, the two dovetails being so fitted together as to allow the cap to slide freely on and move independently of the feed-dog at an angle to the usual motion with the dog in the same direction as the dog moves.

The cap J is so proportioned to the aperture in the vibrating plate as to allow of the usual endwise to-and-fro motion of the ordinary feed; but the plate closely embraces the side of the cap, so that any motion given to the slide is always transferred to the cap, by which means the slide and cap move simultaneously and transversely to the usual line of the feed without affecting the feeding-dog beneath.

My improved presser-foot acts on the work being sewed exactly like the presser-foot of a straight-sewing machine; but it is quite different in its construction and operation, so as to allow it to follow the lateral reciprocations of the vibrating plate of an irregular-stitch sewing-machine, such as a Blanchard overseam-machine.

The regular presser-bar of the machine has fitted to its lower end the support B, Figs. 2, 3, and 4, for the reciprocating bar C. At one end of the bar C is the angle-piece c′, adapted to slide up and down freely in the standard D, which is securely attached to the sliding plate of the machine. At the opposite end of the bar C, and secured to the same by a set-screw, is the presser-foot support E, to which is attached, at E′, the presser-foot F.

The standard D conveys to bar C, which is prevented from rocking by the angle-piece c′, the laterally-reciprocating motion of the plate of the machine. The bar C, which slides freely in the support B, carries with it in its reciprocating movements the presser-foot support E and presser-foot F. Consequently, whatever may be the movements of the bed or work plate of the machine, those of the presser-foot are similar, and since it only receives a lateral reciprocating movement from the standard D, the pressure which it exerts upon the work is adjusted in the usual way, and can be made as heavy or light as may be desired.

The principle of the cutting of my trimmer is practically that of a pair of scissors when two comparatively dull or blunt edges are made to cut by the manner in which they are drawn across each other. The side pressure which, in using scissors, the hand gives the blades is here produced by a spring, $N^2$, and the opening and shutting scissor motion is caused in this instance by the positive action of a cam, K.

By my arrangement the cutting-blades open and shut with each revolution of the main shaft of the machine; but, of course, they can be easily arranged to work less often, if desired.

The actuating-cam K, Fig. 15, is attached securely to the driving-shaft of the machine. The yoke L, Figs. 12 and 1, embraces the cam K, but is made to receive from it only a vertically-reciprocating motion, and is steadied in its movements by the rod $L^2$, projecting from its lower side and working in the support V, which is screwed to the back of the neck of the machine. By means of the screw-stud L′, Figs. 12 and 13, the motions of yoke L are conveyed to the rocking lever M, Fig. 9, at $M^2$.

The lever M is pivoted near its center, at M′, to the side of the neck of the machine, and the motion it receives at $M^2$ it delivers inversely, at $M^3$, to the vertically-reciprocating rod N, Figs. 1, 10, and 11, at N′, which point should be made adjustable. (See Fig. 10.) The rod N is held to its proper position by screws passing through the slots $N^2$ and into the side of the machine-head, also a pin, $N^3$, passing through the bed-plate of the machine. The motion which the rod N receives it conveys, through the pin $N^4$, to the upper trimmer-blade, O, Figs. 1 and 21, at $o^2$. The blade O, as it receives its motion, rocks on its pivot-screw, at $o'$, which pivot-screw is set in the lower trimmer-blade support, R, at $R^3$, Fig. 16.

The lower blade-support, R, is attached to the plate of the machine by screws passing through the slots at R′ R′, Fig. 16, and has a set-off at $R^3$, to furnish a hold for the screw which secures the lower trimmer-blade, P, Fig. 22, to it on its end $R^3$, also for the guard and gage W, Figs. 18, 19, and 20, which is secured to its upper side, $R^2$.

The guide S embraces the edge of the support-plate R; and since said guide S is secured firmly to the bed-plate of the machine, it receives all the strain on the plate of the trimmer when in action, but does not check its lateral reciprocation, should such be desired.

The spring $N^5$, Figs. 10 and 11, bears against the back end and inner side of the upper blade, O, and in a yielding manner keeps its cutting-edge $o^3$ pressed against the cutting-edge P′ of the lower blade, P, acting in this respect similar to the hand of a person using a pair of scissors. By this arrangement of the spring $N^5$ the rod N serves as a guard to prevent the loose thread and ends of the fabric being sewed from catching on the spring, and thus hindering the proper motion of the material.

The cutting-edges of the blades O, Fig. 21, and P, Fig. 22, are smooth, but slightly acute and hollowing a little toward each other, so that when the blades are opened the point and edge of the upper blade, O, project over the lower blade, P, and as the blades close or are shut together their cutting-edges draw across each other in a manner similar to a pair of scissors.

The guard and guide W, Figs. 18, 19, 20, when attached to the support-plate R, as shown in Fig. 1, is made removable and adjustable to different thicknesses of work. Its projecting neck extends along and over the edge of the lower blade, P, and beyond the side line of the needle, but sufficiently high above the plate to allow the work being sewed to slide under it freely. The part W′ serves the purpose of a guard, to prevent the material to be trimmed from curling over and interfering with the cutter, and the part $W^2$ as a guide for the clearance from the machine of the clippings.

The closeness of the trimmer to the needle depends upon whether a long straight seam is to be trimmed or an irregular one. It is advisable that it should trim or cut as close up to the needle or along the side of the same as is possible, first, to allow irregular seams to be made; second, so that the feed shall not get free from the work until the work has been completely trimmed. Of course, the trimmer can be set either close or at a distance from the seam or line of sewing, as may be desired.

The operation of the machine is as follows: Place the work under the presser-foot, as is customary with all machines, and stitch together the pieces of fabric placed over each other at a small or great distance from their edges by either zigzag or straight sewing. As the material thus sewed is drawn away by the feed from the needle, its edge to be trimmed passes between the two blades of the scissors or trimmer, which, by the action of the cam on the driving-shaft and intermediate parts before described, open and close with each stitch, and consequently cut or trim the length of the goods equivalent to the length of the feed.

I am aware that it is not new to combine a trimming device with a sewing-machine, and that many different styles of trimmers have been invented; but I have found my peculiar construction and arrangement to have many advantages over any with which I am acquainted, and particularly so when used with overseaming-machines or on hosiery or knit goods; but it is evident, so far as that part of my invention is concerned, that it is immaterial how the zigzag stitch be made, whether by or through the means of a vibrating cloth-plate or by a vibrating needle. In the latter case the shears might be fixed and stationary.

I am also aware that a machine has been made with a reciprocating feed-dog having a feeding device moving at right angles thereto; but both the feed-dog and feeding-surfaces differ in construction and operation from the corresponding parts used by me, and which I do not herein claim.

Having thus described my invention, what I consider new, and desire to secure by Letters Patent, is—

1. The combination of the presser-bar A, support B, bar C, and presser-foot F with the reciprocating cloth-plate, the said bar C and cloth-plate being connected by a yielding joint, so as to move the presser-foot and cloth-plate simultaneously, with their faces and line of motion always parallel to each other, substantially as described.

2. The combination of the presser-bar A, support B, reciprocating bar C, guide $c'$, and standard D with the reciprocating presser-foot and cloth-plate, the whole arranged and operating substantially as described.

3. The combination of a trimmer with a zigzag feeder, the two being combined, substantially as described, so as to move together laterally, substantially as and for the purposes set forth.

4. The combination, with a reciprocating cloth-plate of a sewing-machine, of a trimmer consisting of two shearing-blades pivoted to each other, one of which receives a vibrating motion from some movable part of the machine, substantially as described.

5. The combination, with a reciprocating cloth-plate, of a trimmer, the two being connected substantially in such a manner as to move together across the line of feed, as and for the purposes set forth.

6. The combination, with the trimmer O P, of the rod N, lever M, yoke L, and cam K, substantially as described.

7. The combination, with a sewing-machine, of a trimmer arranged to move laterally across the ordinary line of feed with the fabric being sewed, the trimmer and sewing mechanism being connected by a yielding joint to allow the trimmer to move sidewise, substantially as described.

8. The combination, with the trimmer O P, of the guard W′, constructed as described, and for the purposes set forth.

9. A trimming device, in combination with mechanism, substantially as described, for making a zigzag stitch, substantially as and for the purposes set forth.

10. The combination, with the stitch-forming and feeding mechanism of a sewing-machine and a trimming device, comprising two shearing-blades pivoted to each other, with mechanism for operating them, of a presser and a guard for holding down or preventing the edge of the work from curling over, substantially as described.

In testimony that I claim the foregoing I have hereunto set my hand this 7th day of June, 1879.

JOHN BIGELOW.

Witnesses:

L. DEANE,

A. J. SCHULTEIS.